US008789952B2

(12) United States Patent
Okamoto et al.

(10) Patent No.: US 8,789,952 B2
(45) Date of Patent: Jul. 29, 2014

(54) IMAGE PROCESSING DEVICE, PROJECTION DISPLAY DEVICE, AND IMAGE PROCESSING METHOD

(75) Inventors: Junichi Okamoto, Suma (JP); Masashi Kanai, Azumino (JP); Satoshi Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 445 days.

(21) Appl. No.: 13/155,739

(22) Filed: Jun. 8, 2011

(65) Prior Publication Data

US 2011/0316896 A1 Dec. 29, 2011

(30) Foreign Application Priority Data

Jun. 28, 2010 (JP) ................................ 2010-146292

(51) Int. Cl.
*G03B 21/20* (2006.01)
(52) U.S. Cl.
USPC .............. 353/85; 353/30; 353/31; 353/70; 353/121; 353/122; 345/589; 345/591; 345/593
(58) Field of Classification Search
USPC ............... 353/30, 31, 69, 70, 85, 121, 122; 348/743–747, E17.005, E5.102, E5.12, 348/E9.025, E9.027, E9.037, E9.054; 345/589–594; 349/5, 7–9
See application file for complete search history.

(56) References Cited

U.S. PATENT DOCUMENTS

| | | | | |
|---|---|---|---|---|
| 4,843,573 A * | 6/1989 | Taylor et al. | ................... | 345/591 |
| 6,072,464 A * | 6/2000 | Ozeki | ........................... | 345/603 |
| 7,034,852 B2 * | 4/2006 | Matsuda et al. | ............... | 345/690 |
| 8,243,210 B2 * | 8/2012 | Bing et al. | ..................... | 348/744 |
| 2001/0050757 A1 | 12/2001 | Yoshida et al. | | |
| 2002/0051121 A1 | 5/2002 | Kanai | | |
| 2002/0097907 A1 * | 7/2002 | Fukasawa | ...................... | 382/167 |
| 2003/0164927 A1 * | 9/2003 | Tsukada | ......................... | 353/31 |
| 2005/0001991 A1 * | 1/2005 | Ulichney et al. | ................ | 353/69 |
| 2006/0202947 A1 | 9/2006 | Lee et al. | | |
| 2007/0097333 A1 * | 5/2007 | Zavarehi et al. | ................ | 353/85 |
| 2008/0165292 A1 | 7/2008 | Bing et al. | | |
| 2011/0001881 A1 * | 1/2011 | Kawahara | ..................... | 348/649 |
| 2011/0310303 A1 * | 12/2011 | Marcus et al. | ................ | 348/649 |

FOREIGN PATENT DOCUMENTS

| | | |
|---|---|---|
| JP | 2002-041017 | 2/2002 |
| JP | 2002-091415 | 3/2002 |
| JP | A-2002-107828 | 4/2002 |
| JP | 2006-251806 | 9/2006 |
| JP | A-2008-165231 | 7/2008 |

* cited by examiner

*Primary Examiner* — Sultan Chowdhury
(74) *Attorney, Agent, or Firm* — Oliff PLC

(57) ABSTRACT

An image processing device generates image data of a projection image displayed on a screen having a color obtained by correcting a color of original data representing an image to be displayed so that the projection image has a desired color. The image processing device includes a storage section adapted to store a spectral reflectivity of the screen, a designation section adapted to designate a type of an outside light in an installation environment of the screen, a correction light determination section adapted to determine a correction light using a spectral distribution of the reflected light obtained based on the spectral reflectivity and a spectral distribution of the outside light, and a color correction section adapted to generate the image data using the original data and data of a spectral distribution of the correction light.

16 Claims, 8 Drawing Sheets

COLORATION DUE TO
OUTSIDE LIGHT WHEN PJ
PERFORMS BLACK DISPLAY

CORRECTION VALUES IN PJ

IMAGE PROCESSING DEVICE, PROJECTION DISPLAY DEVICE, AND IMAGE PROCESSING METHOD

BACKGROUND

1. Technical Field

The present invention relates to an image processing device, a projection display device, and an image processing method.

2. Related Art

In the past, there have been used a projector as a projection device of an enlarged image used for image viewing in, for example, presentations in exhibitions, academic conferences, meetings, and so on, and home theaters.

Generally, the screen used as a projection target surface of a projector, in the case of a reflective screen, for example, reflects the projection light from the projector to thereby display the projection image, and at the same time, reflects the outside light derived from the use environment such as illumination light or sunlight entering from a window. Therefore, there arises a problem that if the projector is used in a bright place, the contrast as a luminance ratio between "white (the highest luminance)" and "black (the lowest luminance)" is lowered to thereby make clear image display difficult.

In order for solving this problem, development of a screen aimed to realize an improved contrast in bright rooms by suppressing the influence of the outside light causing the degradation in the contrast such as sunlight or illumination light to thereby lower the minimum luminance is in progress. As such a screen there is proposed a screen having a configuration in which a light absorption layer including dye or a pigment for absorbing light is provided to thereby absorb unwanted outside light (see, e.g., JP-A-2002-107828 (Document 1)).

Incidentally, although projectors have an advantage of being capable of displaying projection images on various types of projection target surfaces such as screens or walls, the colors of the projection image vary between the projection target surfaces in accordance with the surface conditions of the projection target surface including the color, the depth of the color, and roughness of the surface, and the vision felt by the observer also varies.

For example, the vision is different between the projection image obtained by performing the projection display on a white screen from the projector and the projection image obtained by performing the projection display on a blackboard installed in a classroom of a school. Further, there also arises a problem that if the image display is performed under the illumination light (the outside light) after adjusting the colors of the projection image in a darkroom, the colors are shifted from the setting to thereby degrade the color reproducibility.

In order for solving this problem, there has been proposed a configuration of a projector in which the color information of the projection image on the screen is measured using a color information sensor, and the correction is performed so that the projection image has desired colors and illuminance based on the measurement value (see, e.g., JP-A-2008-165231 (Document 2)).

However, the following problems exist in the inventions described in the documents mentioned above. The screen which absorbs the light with a specific wavelength described in Document 1 can be used as an achromatic screen which preferably absorbs the light of a fluorescent lamp to thereby reduce the influence of the outside light if, for example, it is designed assuming that the fluorescent lamp as the outside light.

However, considering the case in which the screen on which such a design in performed is used in the outside light (e.g., white LED illumination) different from the fluorescent lamp, since the distribution (spectral characteristics) of the light components included in the outside light is different between the types of the outside light, coloring is caused by the outside light obtained after absorbing the light with the specific wavelength, and as a result, it is possible that the achromatic screen fails to be obtained.

In such a case, it is possible to correct the color shift using the invention described in Document 2 having the problem of solving the color shift in the projection image under the presence of the outside light similarly to the case of Document 1. However, in the invention according to Document 2, in order for the correction, it is required to measure the coloration of the screen after absorption of the outside light using the color information sensor, and then determine the correction value based on the measurement result.

In order for making such correction possible, it becomes necessary to perform spectrographic measurement such that what wavelength the light strongly reflected by the screen on which the image projection is not performed has, and what wavelength the light not so strongly reflected by the screen has, and thus the coloration is caused. However, the color information sensor for making such measurement possible is extremely expensive, and is therefore not realistically adopted in the projector used for a general purpose. Further, in the case of using a sensor with low accuracy, a preferable color correction is not achieved, and the intended correction of the color shift is not achieved.

SUMMARY

An advantage of some aspects of the invention is to provide an image processing device capable of correcting the coloration of the projection image with low cost and high accuracy. Another advantage of some aspects of the invention is to provide a projection display device provided with such an image processing device to thereby make it possible to correct the coloration of the projection image with low cost and high accuracy. Still another advantage of some aspects of the invention is to provide an image processing method for making it possible to easily correct the coloration of the projection image with accuracy.

An aspect of the invention is directed to an image processing device adapted to generate image data of a projection image, which is displayed on a projection target surface using a projection display device, having a color obtained by correcting a color of original data representing an image to be displayed so that the projection image has a desired color, the image processing device including a storage section adapted to store a spectral reflectivity of the projection target surface, a designation section adapted to designate a type of an outside light in an installation environment of the projection target surface, a correction light determination section adapted to determine a correction light, a reflected light of which on the projection target surface corresponds to a light having a spectral distribution presenting an achromatic color by overlapping a reflected light of the outside light on the projection target surface, using a spectral distribution of the reflected light of the outside light obtained based on the spectral reflectivity and a spectral distribution of the outside light, and a correction section adapted to generate the image data using the original data and data of a spectral distribution of the correction light.

According to this configuration, there can be provided an image processing device capable of performing an accurate correction without installing an expensive measuring instrument by previously storing the spectral reflectivity of the projection target surface. In other words, the correction light for making the preferable color correction possible can be obtained by using the spectral reflectivity thus stored, and by correcting the original data so as to be added with such correction light, the image data of the projection image on which the preferable color correction has been performed can be generated.

In this aspect of the invention, in the case in which the light intensity of the correction light is not appropriate, even if the correction light is overlapped with the reflected light of the outside light, the achromatic color is not achieved, and it is not achievable to perform a preferable correction. Therefore, in the aspect of the invention, by adopting such a configuration as described below, it is possible to determine the light intensity of the correction light suitable for the correction by measuring the light intensity to thereby perform a further accurate correction.

Firstly, in the image processing device of the aspect of the invention, it is preferable that the correction light determination section includes a light intensity measuring section disposed on the projection target surface, and adapted to measure a light intensity of the outside light entering the projection target surface, and a light intensity of the correction light entering the projection target surface, and a light intensity determination section adapted to determine a light intensity of the correction light so that the achromatic color is presented by overlapping the reflected light of the outside light and the reflected light of the correction light each other based on a light intensity of the reflected light of the outside light obtained based on the light intensity of the outside light, the spectral reflectivity, and the spectral distribution of the outside light, and a light intensity of the reflected light of the correction light obtained based on the light intensity of the correction light, the spectral reflectivity, and the spectral distribution of the correction light.

The light intensity of the correction light emitted from the projection display device (the projector) varies depending on the distance between the projector and the projection target surface, zoom in the projection display, the variation in the light source intensity with time, and so on. Therefore, by disposing the light intensity measuring section on the projection target surface, it becomes possible to directly measure the light intensities of the outside light and the correction light on the projection target surface to thereby determine the appropriate light intensity of the correction light.

The image processing device of the aspect of the invention may be configured such that the correction light determination section includes a light intensity measuring section provided in the projection display device, and adapted to measure a light intensity of the reflected light of the outside light entering the projection target surface, and a light intensity of the reflected light of the correction light entering the projection target surface, and a light intensity determination section adapted to determine a light intensity of the correction light so that the achromatic color is presented by overlapping the reflected light of the outside light and the reflected light of the correction light each other based on the light intensity of the reflected light of the outside light, and the light intensity of the reflected light of the correction light.

If the light intensity measuring section is disposed on the projection target surface, the light intensity measuring section might prevent the projection image from being observed. According to this configuration, such a problem can preferably be eliminated.

The image processing device of the aspect of the invention may be configured such that the correction light determination section includes a sample image forming section adapted to generate sample image data of a plurality of sample images formed using respective candidate correction lights made different from each other in light intensity, a selection section adapted to allow a user to select a specific sample image out of the plurality of sample images, and a light intensity determination section adapted to determine the light intensity of the candidate correction light forming the specific sample image as a light intensity of the correction light.

According to this configuration, by making the user select the sample image, the light intensity of the correction light suitable for the correction can be selected. Specifically, by projecting the plurality of sample images formed using candidate correction lights different from each other in light intensity based on the sample image data on the projection target surface, and then selecting the sample image achieving the achromatic color on the projection target surface, it is possible to make a judgment on the level of the light intensity of the correction light capable of correcting the coloration, and to determine the light intensity of the correction light.

In the aspect of the invention, the correction of the color shift, which might occur when the type of the outside light irradiating the projection target surface changes, is cited as a problem. The type of the outside light can be determined in the following manner.

Firstly, in the image processing device of the aspect of the invention, it is preferable that the storage section stores a characteristic value inherent in the outside light for identifying the outside light with respect to a plurality of types of light assumed as the outside light, and the designation section includes a characteristic value measuring section adapted to measure the characteristic value, and an estimation section adapted to estimate the type of the outside light using a measurement result of the characteristic value measuring section and with reference to the characteristic value stored in the storage section.

Here, the "inherent characteristic value" denotes the characteristic value inherent in the type of the outside light used for identifying the type of the outside light, such as the spectral distribution of the outside light or a blinking state of the outside light.

According to this configuration, the characteristic values of the plurality of types of light stored in the storage section can be used as the reference values for judging the type of the outside light. Therefore, even if the measurement by the characteristic measuring section is simplified measurement, the estimation of the type of the outside light becomes possible, and therefore, the correction becomes also possible using the spectral distribution of the outside light the type of which is identified.

The image processing device of the aspect of the invention may be configured such that the storage section stores spectral distributions of a plurality of types of light assumed as the outside light, and the designation section includes an input section adapted to allow a user to select and input the type of the outside light in the installation environment of the projection target surface out of the plurality of types of light.

According to this configuration, in the case in which the type of the outside light is known, it becomes possible to perform setting of the appropriate correction value by the user designating the type of the outside light without performing unnecessary measurement.

Another aspect of the invention is directed to a projection display device including the image processing device described above, an image forming section to which the image data generated by the image processing device is input, and adapted to form the projection image based on the image data, and a projection optical system adapted to display the projection image formed by the image forming section by projection.

According to this configuration, since the image display can be performed based on the corrected image data generated by the image processing device, the projection display device capable of correcting the coloration of the projection image with low cost and high accuracy can be provided.

Still another aspect of the invention is directed to an image processing method adapted to generate image data of a projection image, which is displayed on a projection target surface using a projection display device, having a color obtained by correcting a color of original data representing an image to be displayed so that the projection image has a desired color, the image processing method including: obtaining a spectral distribution of a reflected light of an outside light in an installation environment of the projection target surface on the projection target surface based on a spectral reflectivity of the projection target surface and a spectral distribution of the outside light, calculating a correction light, a reflected light of which on the projection target surface corresponds to a light having a spectral distribution presenting an achromatic color by overlapping a reflected light of the outside light on the projection target surface, and generating the image data obtained by adding data of the correction light to the original data.

According to this method, there can be obtained the image processing device capable of easily performing the accurate correction by using the spectral reflectivity of the projection target surface measured previously.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an image processing device 10 and a projector PJ according to a first embodiment of the invention will be explained with reference to FIGS. 1 through 5. It should be noted that in all of the drawings described below, the sizes and the ratios between the sizes of the constituents are arbitrarily made different from each other in order for making the drawings eye-friendly.

Figure 1:
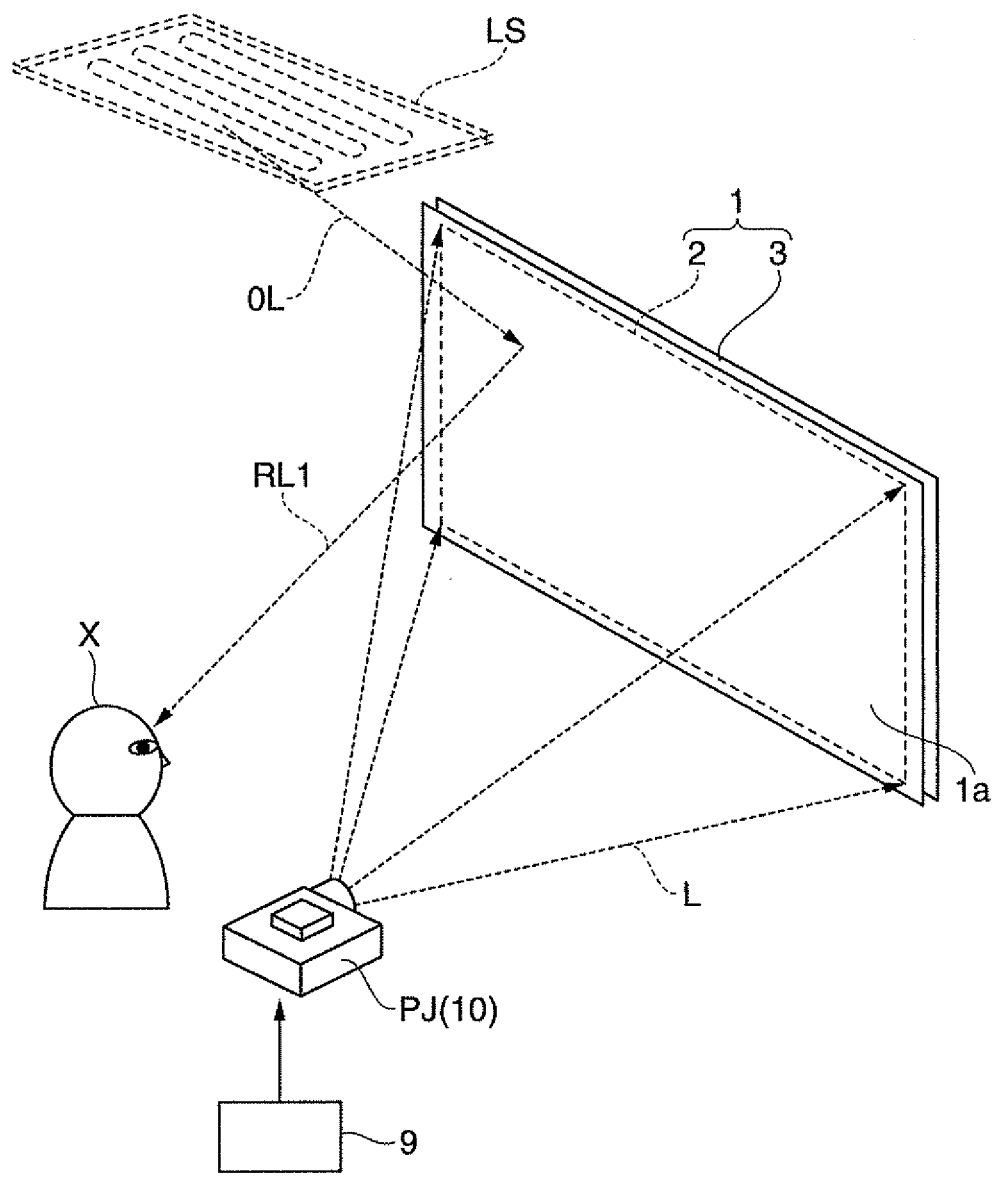
FIG. 1 is a perspective view showing how a projector according to a first embodiment is used.
Figure 2:
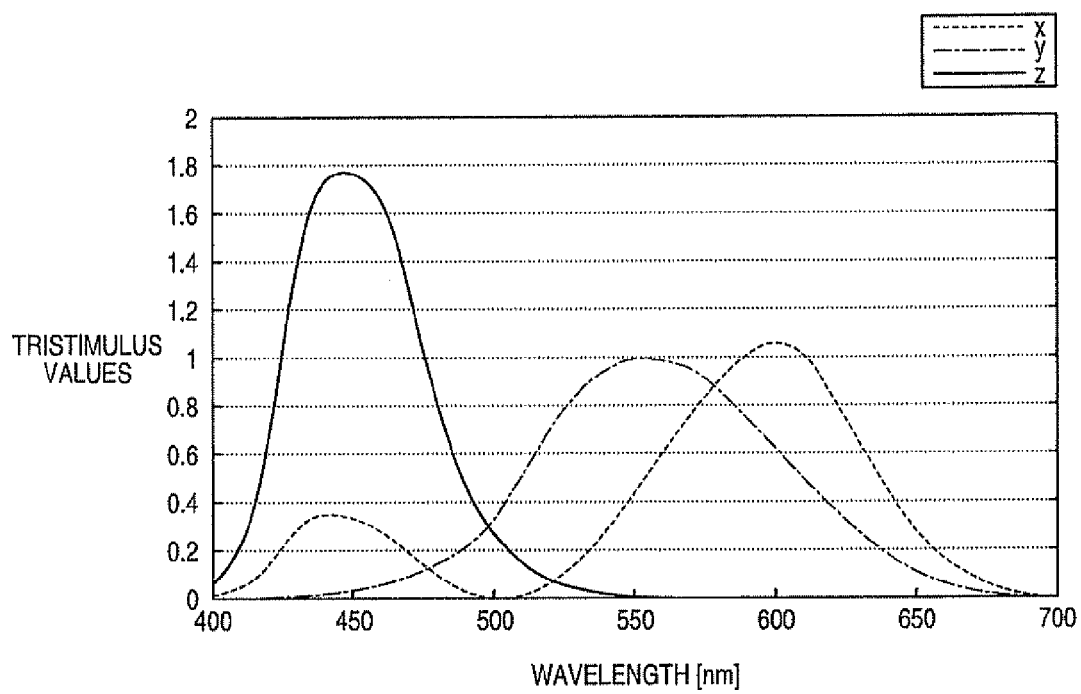
FIG. 2 is a graph showing a color-matching function.

FIG. 1 is a perspective view showing how the projector PJ according to the present embodiment is used. The image processing device 10 according to the present embodiment is incorporated in the projector PJ. As shown in the drawings, the projector PJ according to the present embodiment is a projection display device for projecting projection light L to a projection target surface 1a of a reflective screen 1, and is a projector of a close-up projection type disposed at a position in front of the screen 1 and shifted obliquely downward in the present embodiment.

The image processing device 10 provided in the projector PJ generates the image data corresponding to the image to be displayed by projection by the projector PJ from the image data input from an image input device 9 as a signal source.

The screen 1 used here is a screen having a pigment for selectively absorbing the light with the peak wavelength included in the outside light and designed to reduce the reflected light intensity of the outside light on the screen to thereby achieve improvement of the contrast of the projection image. The screen 1 has, for example, a pigment layer 2 including the pigment for absorbing the outside light, and a reflecting layer 3 disposed on the reverse side (the opposite side to a viewing side) of the pigment layer 2. In the following explanation, the screen having such a function might be referred to as a wavelength-selective screen as needed.

In the case in which such a screen 1 is used in the outside light the pigment included in the pigment layer 2 can preferably absorb, it is possible for the observer X to observe the preferable projection image. However, in the case in which, for example, it is designed assuming that the pigment layer 2 is used in the white LED light source, if the screen 1 is used in the room illumination LS as the fluorescent illumination, the light corresponding to the peak wavelength of the white LED light source out of the outside light OL derived from the room illumination LS is absorbed, and then the remaining part thereof is reflected as reflected light RL1.

In the case in which it is designed assuming that the pigment layer 2 is used in the white LED light source, the absorption wavelength and the absorption light intensity of each of the pigments are usually designed so that the remaining part after the absorption of the light derived from the white LED light source becomes the achromatic color. This is for preventing the coloration of the screen. Specifically, since it is designed that the remaining part after the absorption with respect to the specific outside light becomes the achromatic color, if such a wavelength-selective screen as the screen 1 is used under the outside light environment different from the design environment as described above, the coloration is caused in the reflected light RL1 to thereby incur the deterioration of the image quality of the projection image.

The projector PJ according to the present embodiment assumes the coloration caused when the wavelength-selective screen is used under the outside environment different from the design environment as described above, and emits the light with the color complementary to the color of the coloration simultaneously with the projection image to correct the color of the image, thereby preventing the deterioration of the image quality of the projection image, thus making it possible for the observer X to observe the preferable image. Hereinafter, the explanation therefor will sequentially be presented.

Explanation of Principle

Firstly, the principle of the color correction by the image processing device 10 according to the present embodiment will be explained. In the following explanation, the symbols shown in FIG. 1 will be used as needed.

Assuming first that the spectral distributions of the emission wavelengths with respect to the red light (R), the green light (G), and the blue light (B) emitted by the projector PJ are $f_{pj\text{-}red}(\lambda)$, $f_{pj\text{-}green}(\lambda)$, and $f_{pj\text{-}blue}(\lambda)$, respectively, and the spectral reflectivity of the screen 1 is $f_{screen}(\lambda)$ the spectral distribution the light emitted from the projector PJ has when the light is reflected by the screen 1 and then reaches the observer X is expressed by the product g of the spectral distribution of the emission wavelength of the projector PJ and the spectral reflectivity of the screen 1. For example, when the red light is emitted from the projector PJ, the spectral distribution $g_{pj\text{-}red}(\lambda)$ of the red light reaching the observer X is expressed by the formula 1 below.

$$g_{pj\text{-}red}(\lambda) = f_{pj\text{-}red}(\lambda) \cdot f_{screen}(\lambda) \quad (1)$$

As an example, the red light emitted from the projector PJ and reaching the observer X is expressed by the tristimulus values X, Y, and Z as the formulas 2 through 4 below. In the formulas, x, y, and z denote the color-matching functions shown in FIG. 2, and k denotes the coefficient expressed by the formula 5 below. Further, the integration range of the formulas 2 through 4 represents the visible light range.

$$X = k \int_{vis} g_{pj\text{-}red}(\lambda) \cdot \bar{x}(\lambda) d\lambda \quad (2)$$

$$Y = k \int_{vis} g_{pj\text{-}red}(\lambda) \cdot \bar{y}(\lambda) d\lambda \quad (3)$$

$$Z = k \int_{vis} g_{pj\text{-}red}(\lambda) \cdot \bar{z}(\lambda) d\lambda \quad (4)$$

$$k = \frac{100}{\int_{vis} g_{pj\text{-}red}(\lambda) \cdot \bar{y}(\lambda) d\lambda} \quad (5)$$

In the above formulas, the subscript "red" represents the red light, and the green light and the blue light can also be expressed similarly by the tristimulus values by substituting the subscript with "green" and "blue," respectively.

By calculating the trichromatic coordinate x, y in the xyY color system using the tristimulus values thus obtained, it is possible to obtain the xy chromaticity diagram which can be displayed using the projector PJ and the screen 1.

Then, the tristimulus values $X_{ALL}$, $Y_{ALL}$, and $Z_{ALL}$ representing the projection image displayed on the screen 1 under the presence of the outside light OL as shown in FIG. 1 are expressed as the formula 6 below using the tristimulus values described above. In the formula, the intensity of the outside light OL on the screen 1 is denoted as $I_{GAIKOU}$, the tristimulus values representing the coloration by the outside light OL on the screen 1 are denoted as $X_{IRO}$, $Y_{IRO}$, and $Z_{IRO}$, the intensities of the red light, the green light, and the blue light emitted from the projector PJ are denoted as R, G, and B. Further, the tristimulus values of the red light in the case in which the red light alone is emitted from the projector PJ are denoted as $X_R$, the tristimulus values of the green light in the similar case are denoted as $X_G$, and the tristimulus values of the blue light are denoted as $X_B$.

$$\begin{bmatrix} X_{ALL} \\ Y_{ALL} \\ Z_{ALL} \end{bmatrix} = I_{GAIKOU} \begin{bmatrix} X_{IRO} \\ Y_{IRO} \\ Z_{IRO} \end{bmatrix} + \begin{bmatrix} X_R & X_G & X_B \\ Y_R & Y_G & Y_B \\ Z_R & Z_G & Z_B \end{bmatrix} \begin{bmatrix} R \\ G \\ B \end{bmatrix} \quad (6)$$

The formula 6 can be modified as expressed in the formula 7 below.

$$\begin{bmatrix} R \\ G \\ B \end{bmatrix} = \begin{bmatrix} X_R & X_G & X_B \\ Y_R & Y_G & Y_B \\ Z_R & Z_G & Z_B \end{bmatrix}^{-1} \begin{bmatrix} X_{ALL} \\ Y_{ALL} \\ Z_{ALL} \end{bmatrix} - I_{GAIKOU} \begin{bmatrix} X_R & X_G & X_B \\ Y_R & Y_G & Y_B \\ Z_R & Z_G & Z_B \end{bmatrix}^{-1} \begin{bmatrix} X_{IRO} \\ Y_{IRO} \\ Z_{IRO} \end{bmatrix} \quad (7)$$

It is understood from the formula 7 that even if the coloration is caused in the projection image due to the outside light, by setting the tristimulus values $X_{ALL}$, $Y_{ALL}$, and $Z_{ALL}$ representing the projection image to be displayed on the screen 1 as the tristimulus values of the color desired to be displayed, the corresponding intensities R, G, and B of the outgoing light of the projector PJ can be calculated. Specifically, it is understood that the intensities R, G, and B of the outgoing light of the projector PJ can be calculated so that the projection image has the desired color (the tristimulus values of the desired color) if each of the values included in the second term in the right-hand side of the formula 7 is known.

Figure 3A:
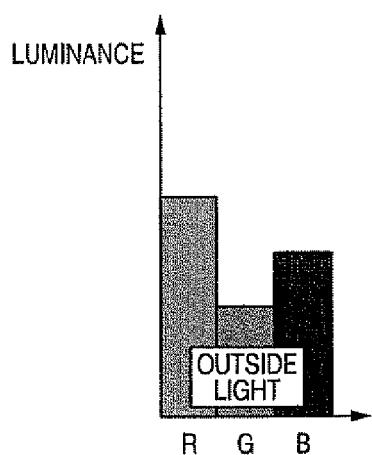
FIGS. 3A and 3B are schematic diagrams for explaining correction by the image processing device according to the first embodiment.
Figure 3B:
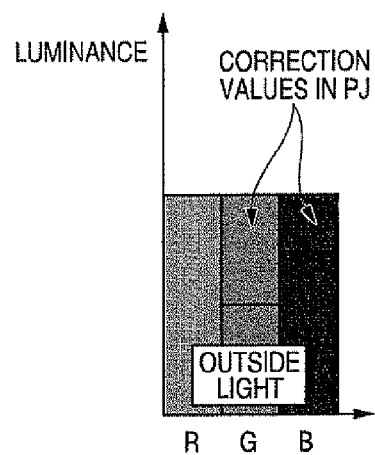

FIGS. 3A and 3B are schematic diagrams for explaining how such a correction is performed, wherein FIG. 3A shows the condition before the correction in the case of performing the black display by the projector PJ, and FIG. 3B shows the condition after the correction. The symbols R, G, and B described on the lateral axis respectively represent the colored light component of the red light, the green light, and the blue light, and the vertical axis represents the luminance (intensity) of the respective colored lights. In the expression of the drawing, it is assumed that the achromatic color is obtained in the case in which the intensities of the respective colored lights, namely the red light, the green light, and the blue light are the same (the heights in the vertical axis direction are the same).

In other words, while the coloration is caused due to the difference in amount between the colored light components (difference in height between the colored light components) in the reflected light of the outside light OL on the screen 1 (FIG. 3A), the image processing device 10 according to the present embodiment generates the image data on which the color correction is performed so as to compensate the difference between the colored light components causing the coloration, and then performs the correction (FIG. 3B) so that the screen 1 looks the achromatic color. The colored light components can be expressed by being substituted with the tristimulus values.

Specifically, since the correction values by the projector PJ shown in FIG. 3B can be obtained if there are known (i) the intensity $I_{GAIKOU}$ of the outside light OL, (ii) the tristimulus values of each of the colored lights obtained when the colored light alone is emitted from the projector PJ expressed as the second term of the right-hand side of the formula 6 above, and (iii) the tristimulus values $X_{IRO}$, $Y_{IRO}$, and $Z_{IRO}$ representing the coloration on the screen 1 due to the outside light OL, the color correction can be performed.

However, since the spectroscope capable of accurately measuring the tristimulus values is an extremely expensive device, it is not realistic to install the spectroscope in the image processing device 10 or the projector PJ used for a general purpose. Therefore, in the image processing device 10 according to the present embodiment, the values of (ii) and (iii) described above are calculated based on the information of the spectral reflectivity $f_{screen}(\lambda)$ of the screen 1 obtained separately, the spectral distribution of the emission wavelength of the projector PJ, and the spectral distribution of the outside light OL, and are used as substitutions.

Device Configuration

Figure 4:
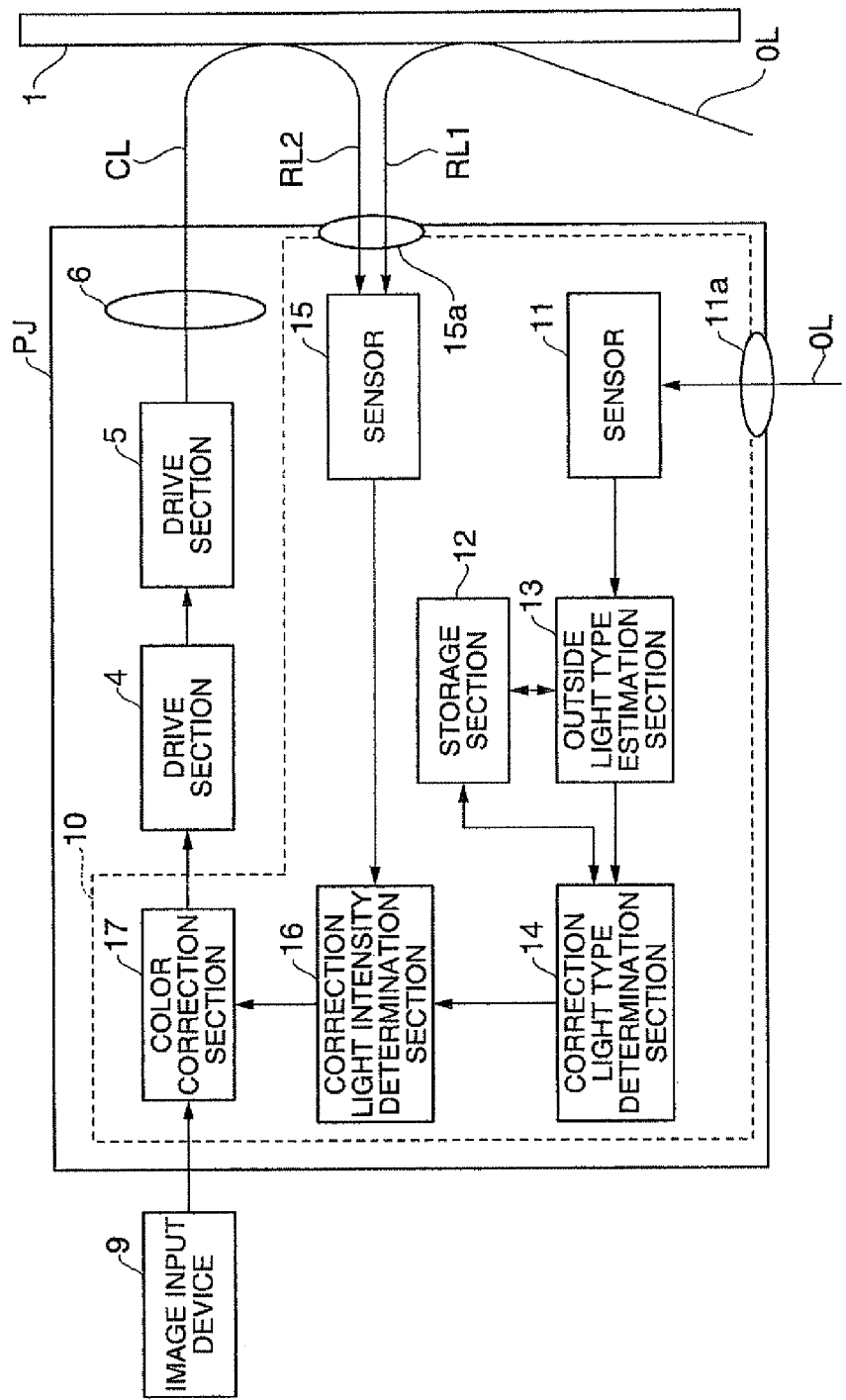
FIG. 4 is an explanatory diagram for explaining the image processing device and the projector according to the first embodiment.

FIG. 4 is an explanatory diagram for explaining the image processing device 10 and the projector PJ according to the present embodiment.

As shown in the drawing, the projector PJ according to the present embodiment has the image processing device 10 to which the original data of the projection image is input from the image input device 9, a drive section 4 for a light valve (L/V, an image forming section) to which the image data generated by the image processing device 10 is input, an image forming section 5 driven by the drive section 4, and a projection optical system 6 for displaying the image formed by the image forming section 5 by projection. It is also possible to supply the image data generated by the image processing device 10 to the light source device not shown to thereby perform control of the light intensity of the image.

The image processing device 10 has a sensor (a characteristic value measuring section) 11 for receiving the outside light OL, a storage section 12 for storing various data, an outside light type estimation section (an estimation section) 13 for estimating the type of the outside light OL using the data stored in the storage section 12, a correction light type determination section 14 for determining the type of the correction light CL using the data supplied from the storage section 12 and the outside light type estimation section 13, a sensor 15 (a light intensity measuring section) for receiving the light reflected by the screen 1, a correction light intensity determination section (a light intensity determination section) 16 for determining the light intensity of the correction light CL using the data supplied from the correction light type determination section 14 and the sensor 15, and a color correction section (a correction section) 17 for correcting the original image data using the correction light CL the type and the light intensity of which have been determined to thereby generate the image data.

The sensor 11 and the outside light type estimation section 13 constitute a designation section according to the invention. Further, the correction light type determination section 14, the sensor 15, and the correction light intensity determination section 16 constitute a correction light determination section according to the invention.

Firstly, the sensor 11 receives the outside light OL via an outside light introducing section 11a. As the sensor 11, a so-called color sensor can be used. The color sensor is a light receiving element such as a charge coupled device (CCD) image sensor or a complementary metal oxide semiconductor (CMOS) image sensor provided with color filters of three colors R, G, and B, and outputs the voltage depending on the product of the transmittance of each of the color filters and the wavelength sensitivity of the light receiving element as an output value.

In such a color sensor using the three color filters of R, G, and B, the light intensities of the respective three bands can be obtained. By using n types of color filters having the respective absorption wavelengths (transmission wavelengths) different from each other, the light intensities of the n bands can be obtained. Further, it is also possible to perform color separation using diffraction elements instead of using the color filters.

Further, the sensor 11 can detect whether the outside light OL is emitted continuously or blinking based on whether or not the output value varies periodically.

In the storage section 12, there are stored inherent characteristic values corresponding to the types of the outside light such as the spectral distribution data of two or more types of light which can be assumed as the outside light, and the spectral reflectivity of the screen 1. As the assumable outside light, there can be cited, for example, fluorescent light, white LED light, incandescent light, and sunlight.

Further, if the outside light OL is the fluorescent light, the outside light OL blinks at a frequency between 50 Hz and 60 Hz. Therefore, presence or absence of the blinking and the blinking period are also stored as the inherent characteristic values.

Further, it is also possible that the storage section 12 stores the spectral distribution of the projector and the tristimulus values $X_R$, $X_G$, and $X_B$ of the colored light emitted by the projector, and that the tristimulus values of the colored light are used for the calculation of the correction light described later.

The outside light type estimation section 13 estimates the type of the outside light OL based on the result of the light reception by the sensor 11 while referring to the spectral distribution data of the outside light stored in the storage section 12. Although it is difficult to expect the accuracy as high as that of the spectroscope as an analytical instrument, the spectral distribution of the outside light OL or the tendency of the spectral distribution can be detected by the sensor 11. Therefore, the type of the outside light showing the spectral distribution the most approximate to the result of the light reception by the sensor 11 is selected from the spectral distribution data of the outside light stored in the storage section 12 to thereby estimate the type of the outside light OL. The estimation is performed based on, for example, the position of the peak wavelength, presence or absence of the blinking, and the blinking period.

The correction light type determination section 14 determines the type of the correction light CL based on the spectral reflectivity of the screen 1 stored in the storage section 12 and the type of the outside light OL estimated by the outside light type estimation section 13. Specifically, since the spectral distribution of the reflected light RL1 can be obtained based on the spectral distribution data of the outside light OL thus estimated and the spectral reflectivity of the screen 1 (the formula 1 described above), there can be determined the correction light CL, which is overlapped with the reflected light RL1 causing the coloration to thereby achieve the achromatic color. The correction light CL is expressed by the ratio between the red light (R), the green light (G), and the blue light (B) emitted from the projector PJ.

Incidentally, the sensor 15 receives the light reflected by the screen 1 via the reflected light introducing section 15a, and then obtains the intensity of the reflected light. The sensor 15 is a luminance sensor disposed for obtaining the intensity of the reflected light, and receives the light reflected by the screen 1 (the reflected light RL1 of the outside light OL and the reflected light RL2 of the correction light CL) in order for determining the intensity ($I_{GAIKOU}$) of the reflected light RL1 and the appropriate light intensity of the correction light CL.

The correction light intensity determination section 16 determines the light intensity of the correction light CL based on the type of the correction light CL determined by the correction light type determination section 14 and the intensity of the reflected light RL1 obtained by the sensor 15. Specifically, the correction light type determination section 14 determines only the type of the correction light CL, and cannot have determined how much amount is necessary to be overlapped with the reflected light RL1 for achieving the achromatic color. Therefore, the light intensity of the correction light CL is determined referring to the intensity of the reflected light RL1 obtained by the sensor 15. Although the value of the correction light CL thus determined is used for generation of the image data in the color correction section 17 described later, it is also possible to have the data of the correction light CL as a table of the correction values each obtained by adding the correction light CL to the corresponding pixel value defined by the original data input thereto.

Here, the necessary light intensity of the correction light CL varies depending on the distance between the projector PJ and the screen 1, zoom in the projection display, the variation in the light source intensity with time, and so on. Therefore, the light intensity of the correction light CL is tentatively set first in the condition of fixing the RGB ratio. Subsequently, the process of emitting the correction light CL from the projector PJ and then receiving the intensity of the reflected light of the correction light CL by the sensor 15 to thereby modify the light intensity of the correction light CL is repeated, and then the calculation value of the light intensity of the correction light CL which achieves the achromatic color when being overlapped with the reflected light RL1 is set as a target value. Then, if the sensor 15 receives the target value, it is determined as the light intensity of the correction light CL.

The color correction section 17 corrects the original data input from the image input device 9 using the correction light CL the type and the light intensity of which are determined to thereby generate the image data of the projection light.

Image Processing Flow

Figure 5:
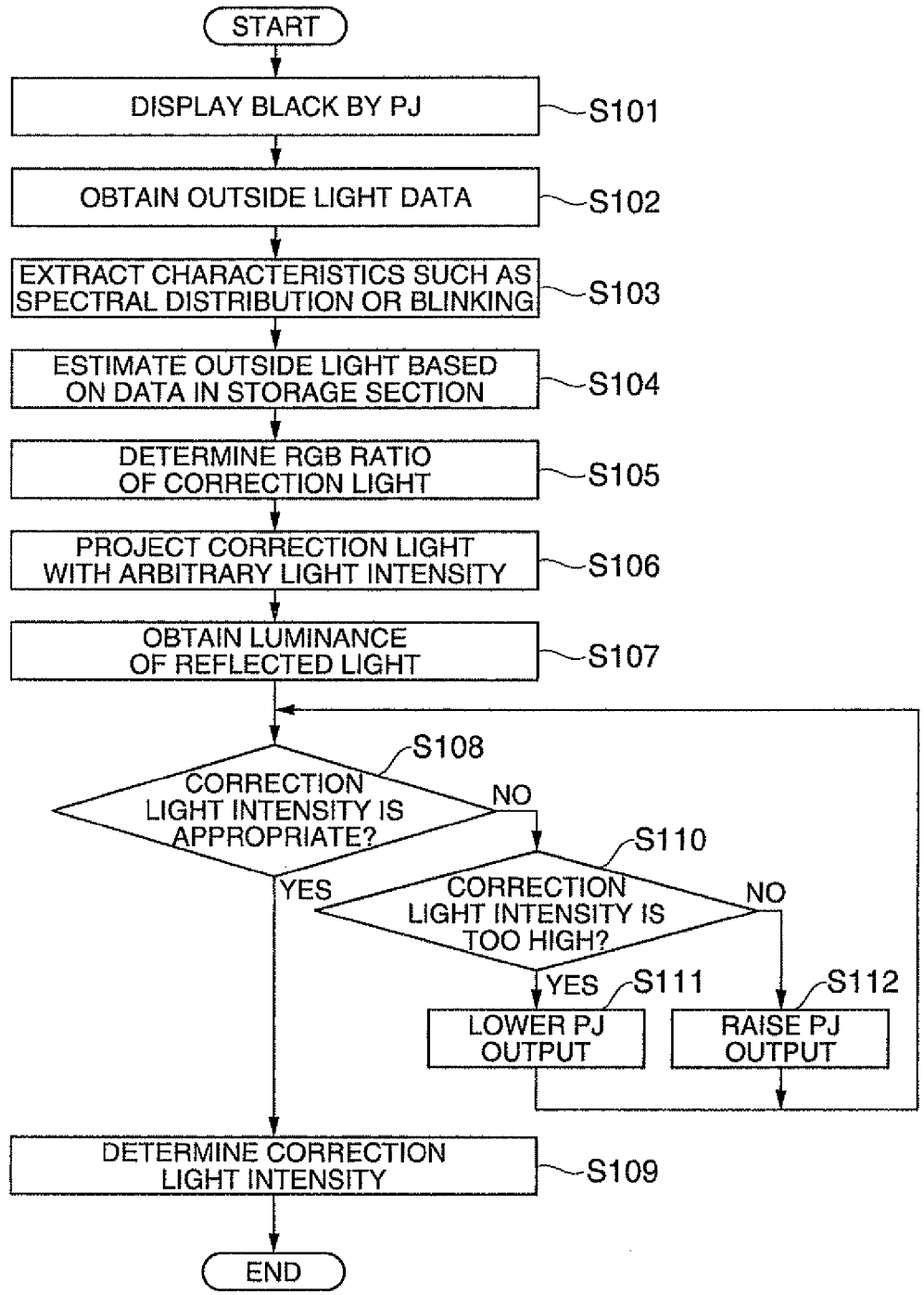
FIG. 5 is a flowchart showing a process in the image processing device according to the first embodiment.

FIG. 5 is a flowchart showing the process in the image processing device 10 and the projector PJ according to the present embodiment. In the following explanation, the symbols shown in FIG. 4 will be used as needed.

In the case of performing the image display on the screen 1 as a wavelength-selective screen using the projector PJ, firstly, the projector PJ is started up, then the projector PJ is made to perform black display (step S101), and the light intensity of the reflected light RL1 of the outside light OL is detected using the sensor 15 in the condition in which no light from the projector PJ exists. Further, the outside light OL is received by the sensor 11 (step S102).

Subsequently, the feature of the outside light OL such as the spectral distribution or the blinking state is extracted (step S103) from the reception result in the sensor 11 in the outside light type estimation section 13, and then the type of the outside light is estimated (step S104) referring to the data of the storage section 12.

Subsequently, the correction light type determination section 14 determines (step S105) the RGB ratio of the correction light CL based on the spectral reflectivity of the screen 1 stored in the storage section 12 and the type of the outside light OL estimated by the outside light type estimation section 13. Then, the correction light CL with arbitrary light intensity is projected (step S106) from the projector PJ to the screen 1 in the condition of fixing the RGB ratio.

Subsequently, the light including the reflected light RL1 of the outside light OL and the reflected light RL2 of the correction light CL combined with each other is received and the light intensity thereof is detected (step S107) using the sensor 15, and then determination on whether or not the correction can appropriately be performed by the correction light CL is performed (step S108). The determination is performed using the a criterion of, for example, whether or not the light intensity of the correction light CL thus measured is within a predetermined error range with respect to the light intensity (the target value which is equal to the light intensity added with R, G, and B shown in FIG. 3B) for achieving the achromatic color in the calculation if overlapped with the reflected light RL1 having the light intensity measured similarly.

If the light intensity of the correction light CL thus measured is not significantly different from the target value, the correction light intensity determination section 16 determines (step S109) the light intensity of the correction light CL initially determined as the light intensity used for the correction.

Further, if the light intensity of the correction light CL is not appropriate, the correction light intensity determination section 16 determines (step S110) whether or not the light intensity of the correction light CL is higher than the detection result by the sensor 15. The correction light intensity determination section 16 modifies (step S111) the correction light intensity so as to lower the output of the correction light CL from the projector PJ if the light intensity of the correction light CL is higher, or modifies (step S112) the correction light intensity so as to raise the output of the correction light CL from the projector PJ if the light intensity of the correction light CL is lower.

After having adjusted the output of the correction light CL, the correction light CL is emitted again from the projector PJ to the screen 1, and then the determination on whether or not the correction can appropriately be performed by the correction light CL is performed again (step S108) to thereby determine (step S109) the appropriate light intensity of the correction light CL.

The image processing device 10 according to the present embodiment performs the image processing in such a manner as described above, and the projector PJ performs the image display using the image data thus obtained.

According to the image processing device 10 having such a configuration as described above, the accurate correction can be performed without installing an expensive measuring instrument by previously storing the spectral reflectivity of the screen 1. In other words, the type of the correction light for making the preferable correction possible can be specified by using the spectral reflectivity thus stored, and by correcting the original data so as to be added with such correction light, the image data of the projection image on which the preferable color correction has been performed can be generated.

Further, according to the projector PJ having the configuration described above, since the image display can be performed based on the corrected image data generated by the image processing device 10, the projector PJ capable of correcting the coloration of the projection image with low cost and high accuracy can be provided.

Further, according to such an image processing method as described above, there can be obtained the image processing device capable of easily performing the accurate correction by using the spectral reflectivity of the projection target surface measured previously.

It should be noted that although in the present embodiment it is assumed that the projector PJ has the sensor 15, and measures the reflected lights RL1, RL2, it is also possible to assume that the sensor 15 is provided at the screen 1, and directly measures the light intensities of the outside light OL and the correction light CL on the light irradiation surface.

The light intensity of the correction light CL emitted from the projector PJ varies depending on the distance between the projector PJ and the screen 1, zoom in the projection display, and so on. Therefore, by disposing the sensor 15 on the screen 1, it becomes possible to directly measure the light intensities of the outside light and the correction light on the screen 1 to thereby determine the appropriate light intensity of the correction light CL.

Further, although in the present embodiment it is assumed that the storage section 12 stores the characteristic values inherent in the outside light, and the correction light type determination section 14 calculates the tristimulus values $X_{IRO}$, $Y_{IRO}$, and $Z_{IRO}$ representing the coloration on the screen 1 using the characteristic values thus stored, this is not a limitation, but it is also possible to assume that the storage section 12 stores the tristimulus values $X_{IRO}$, $Y_{IRO}$, and $Z_{IRO}$ obtained previously making the type of the outside light and the type of the screen correspond to each other.

Second Embodiment

Figure 6:
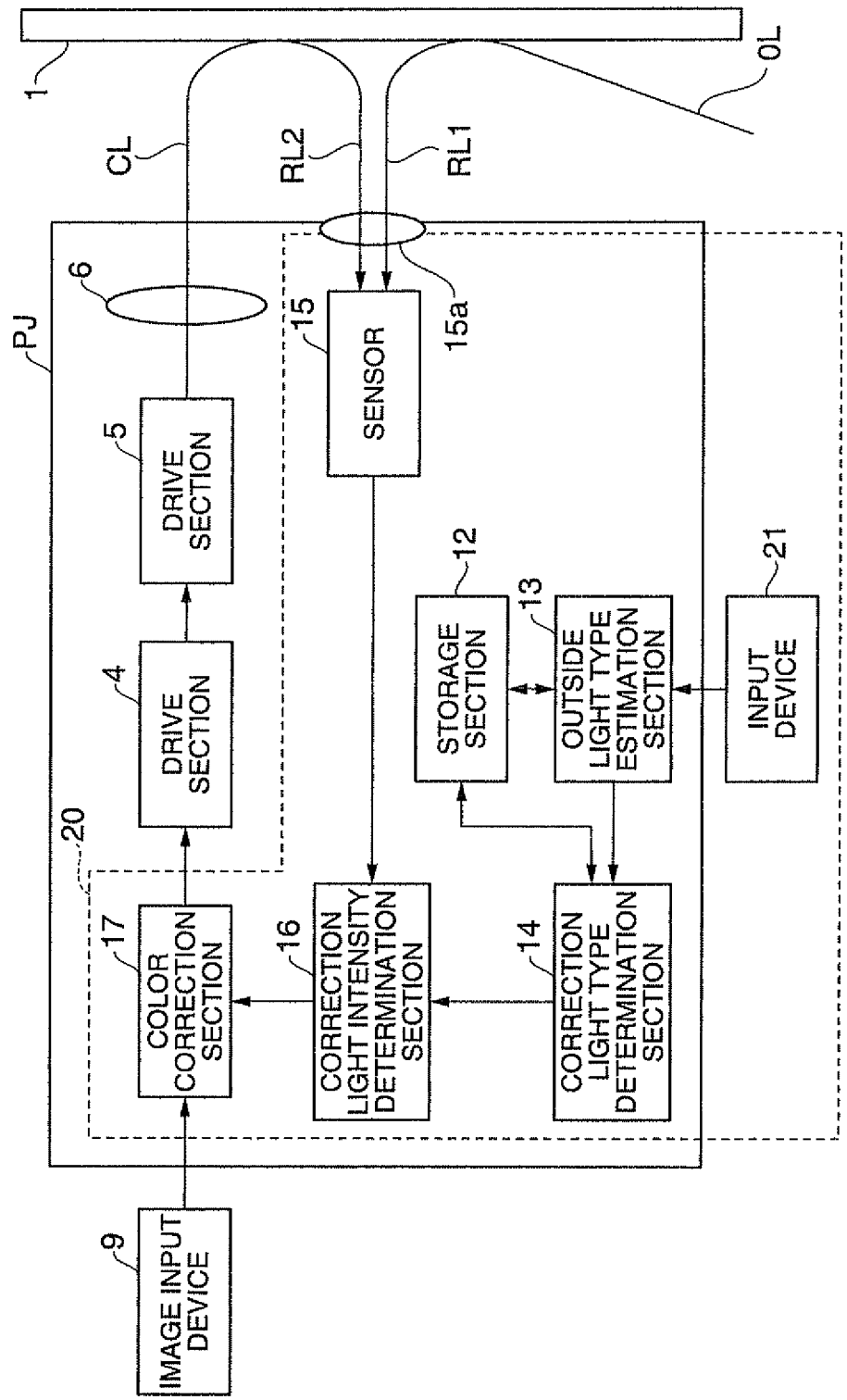
FIG. 6 is an explanatory diagram for explaining the image processing device and the projector according to a second embodiment.
Figure 7:
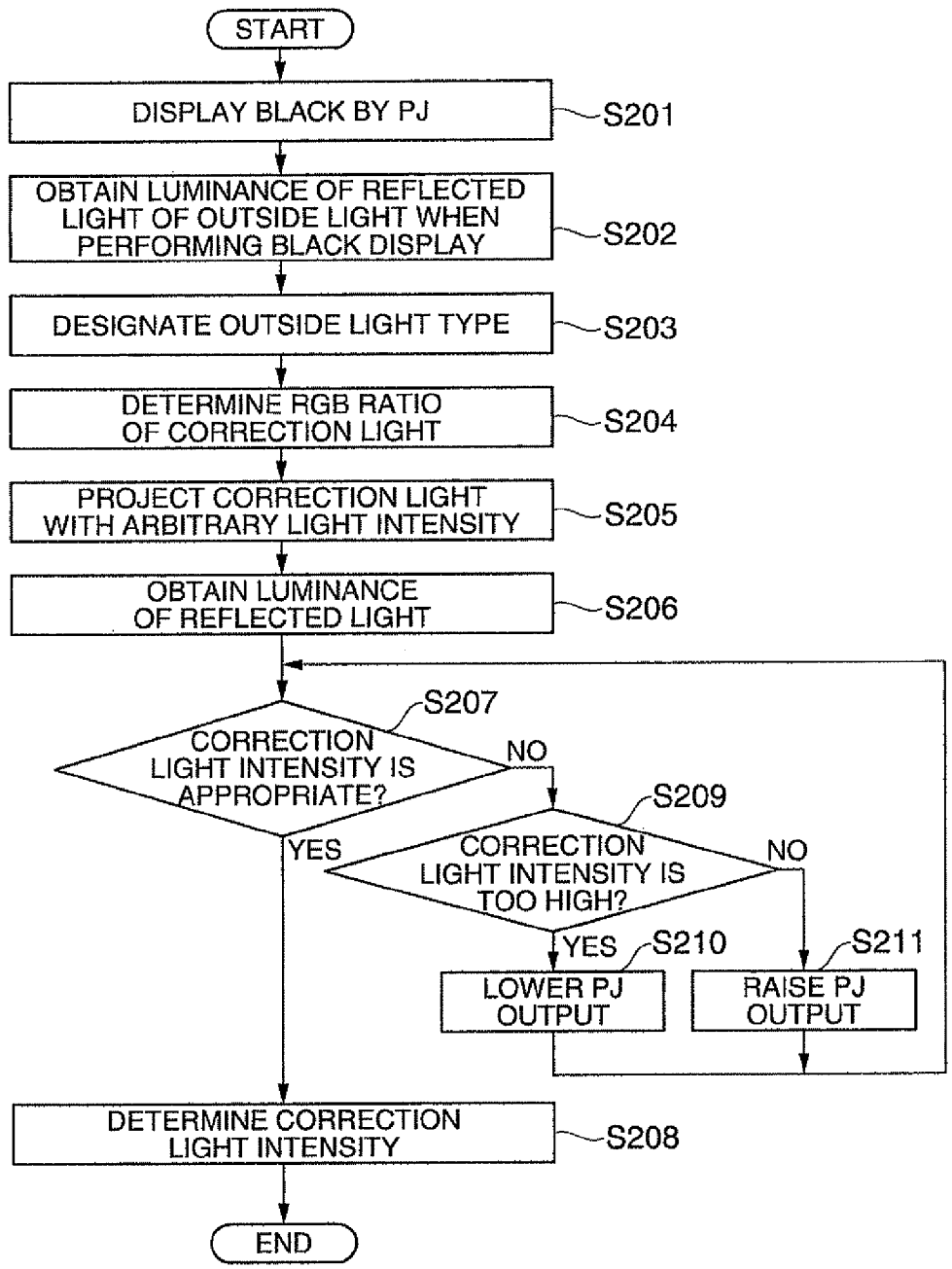
FIG. 7 is a flowchart showing a process in the image processing device according to the second embodiment.

FIGS. 6 and 7 are explanatory diagrams for an image processing device 20 and the projector PJ according to a second embodiment of the invention. The image processing device 20 and the projector PJ according to the present embodiment have many points common to the image processing device 10 and the projector PJ according to the first embodiment. Therefore, the constituents common to the present embodiment and the first embodiment are denoted by the same reference symbols, and the detailed explanation therefor will be omitted.

FIG. 6 is an explanatory diagram for explaining the image processing device 20 and the projector PJ according to the present embodiment, and corresponds to FIG. 4 in the first embodiment.

The image processing device 20 and the projector PJ according to the present embodiment are different from the image processing device 10 and the projector PJ according to the first embodiment in the point that the sensor 11 provided to the image processing device 10 is eliminated, and there is provided an input device (an input section) 21 with which the observer arbitrarily selects the type of the outside light and inputs it to the outside light type estimation section 13. The input device 21 and the outside light type estimation section 13 constitute the designation section according to the invention.

The input device 21 is used for inputting the type of the outside light OL determined by the observer into the outside light type estimation section 13. If the type of the outside light OL in the use environment of the screen 1 is known, the calculation load of the image processing device 20 can be reduced by the observer inputting the information of the type of the outside light OL. As the input device 21, there can be used an input section such as a keyboard, an input button, or a tough screen which displays a graphical user interface (GUI) showing a plurality of types of outside light stored in the storage section 12, and allows the observer to select one of the types.

FIG. 7 is a flowchart showing the process in the image processing device 20 and the projector PJ according to the present embodiment, and corresponds to FIG. 5 in the first embodiment. In the following explanation, the symbols shown in FIGS. 1 and 6 will be used as needed.

Firstly, after starting up the projector PJ, the projector PJ is made to perform black display (step S201), and the light intensity of the reflected light RL1 of the outside light OL is detected (step S202) using the sensor 15 in the condition in which no light from the projector PJ exists. Thus, the luminance of the reflected light colored by the outside light in the black display can be obtained. The luminance thus detected corresponds to the sum of the luminance values of the respective colored light components of the reflected light colored by the outside light.

Subsequently, the observer X inputs the information of the type of the outside light OL using the input device 21 to thereby designate the type (step S203). For example, in the case in which the type of the outside light OL is known such as the case in which it is known that the fluorescent lamp is used as the illumination in the use environment of the screen 1, the type of the outside light is designated.

Subsequently, the correction light type determination section 14 determines (step S204) the RGB ratio of the correction light CL based on the spectral reflectivity of the screen 1 stored in the storage section 12 and the type of the outside light OL input to the outside light type estimation section 13.

Subsequently, in the image processing device 20 substantially the same operation as in the steps S106 through S112 in the first embodiment is performed as the steps S205 through S211 to thereby generate the image data on which the color correction is appropriately performed.

In other words, by designating the type of the outside light, the ratio between the colored light components of the outside light having the coloration can be obtained based on the spectral distribution of the outside light and the spectral reflectivity of the screen, and the light intensities of the respective colored light components of the reflected light can be obtained based on this ratio and the light intensity of the reflected light in the black display of the projector PJ measured initially. In the steps S205 through S211, there is generated the image data on which the color correction to the light intensities of the respective colored light components of the reflected light thus obtained is appropriately performed.

Further, the projector PJ performs the projection display on the screen 1 using the image data thus generated.

In the image processing device 20 and the projector PJ having such a configuration as described above, it also becomes possible to correct the coloration, which might be caused by the difference in the use environment of the wavelength-selective screen, with low cost and high accuracy.

Third Embodiment

Figure 8:
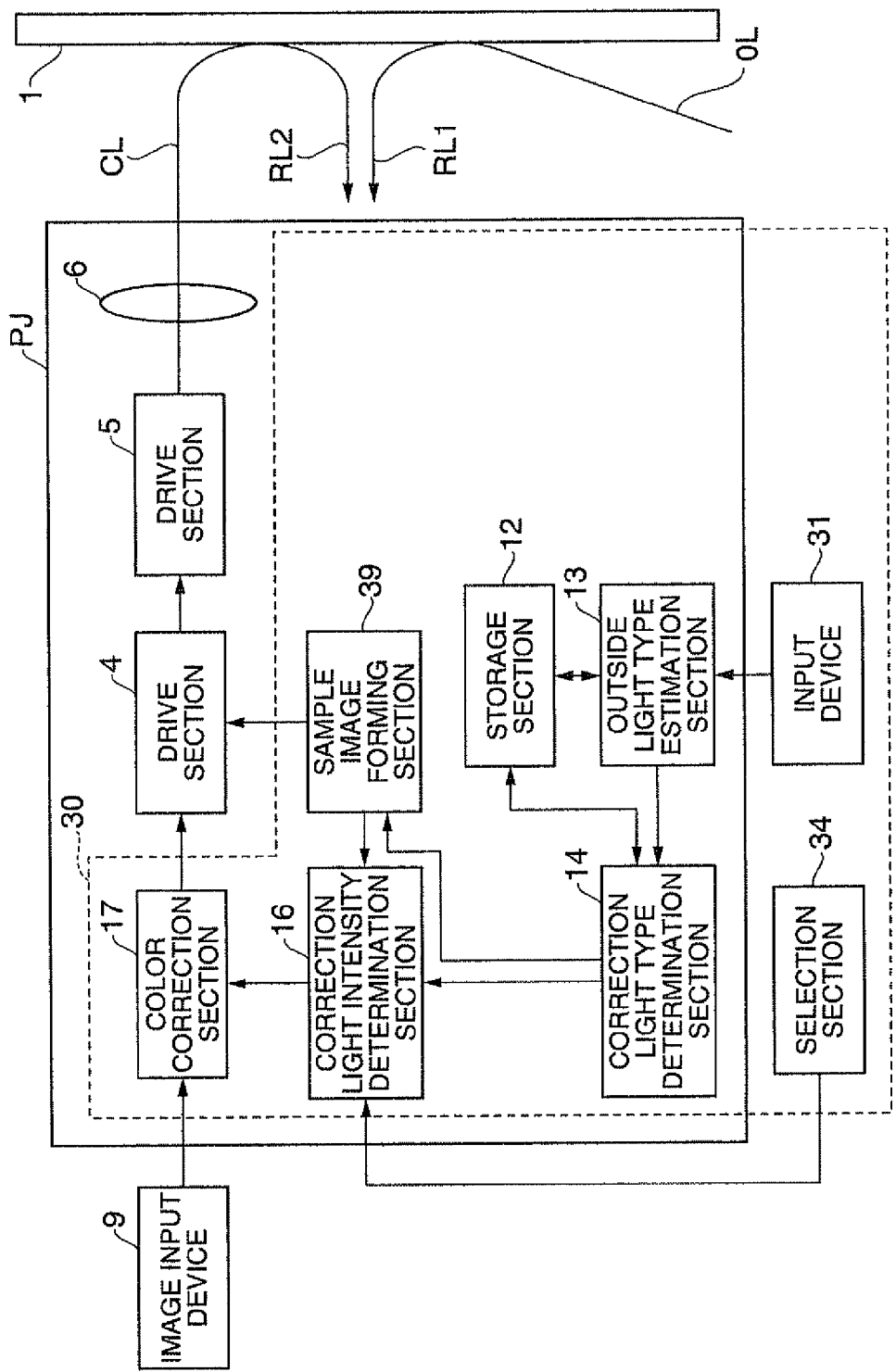
FIG. 8 is an explanatory diagram for explaining the image processing device and the projector according to a third embodiment.
Figure 9:
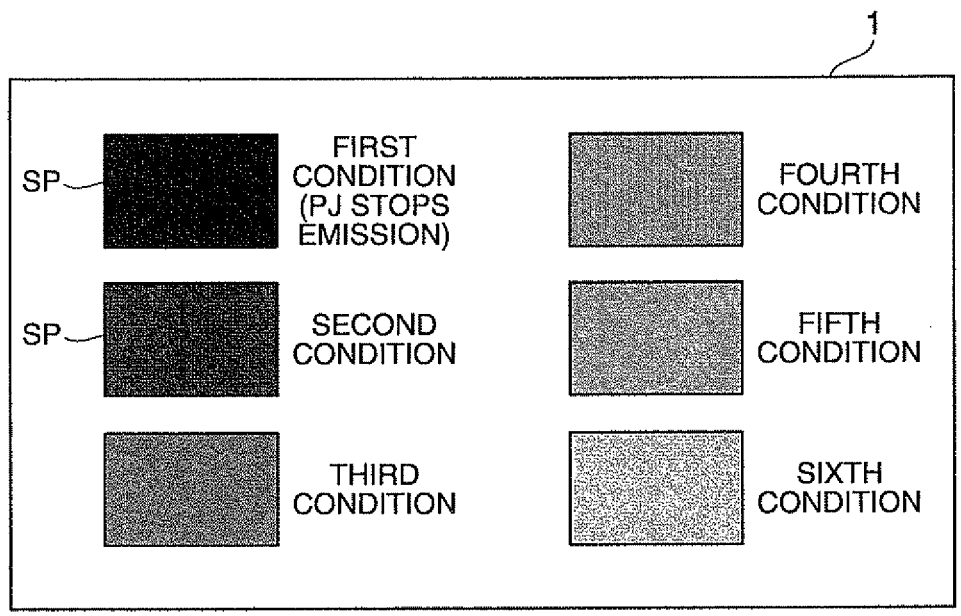
FIG. 9 is a schematic diagram showing an example of a sample image.
Figure 10:
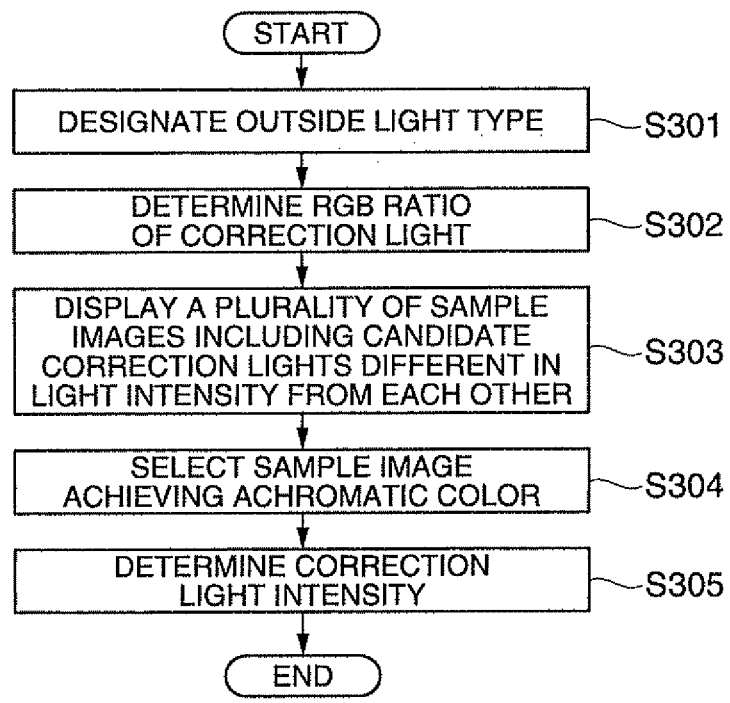
FIG. 10 is a flowchart showing a process in the image processing device according to the third embodiment.

FIGS. 8 through 10 are explanatory diagrams for an image processing device 30 and the projector PJ according to a third embodiment of the invention. The image processing device 30 and the projector PJ according to the present embodiment have many points common to the image processing device 20 and the projector PJ according to the second embodiment. Therefore, the constituents common to the present embodiment and the second embodiment are denoted by the same reference symbols, and the detailed explanation therefor will be omitted. Further, the same is applied to the constituents common to the present embodiment and the first embodiment.

FIG. 8 is an explanatory diagram for explaining the image processing device 30 and the projector PJ according to the present embodiment, and corresponds to FIG. 4 in the first embodiment and FIG. 6 in the second embodiment.

The image processing device 30 and the projector PJ according to the present embodiment are different from the image processing device 20 and the projector PJ according to the second embodiment in the point that the sensor 15 provided to the image processing device 20 is eliminated, and there is provided a selection section 34 for allowing the observer to select the light intensity of the outside light and input it into the correction light intensity determination section 16, and the point that there is provided a sample image forming section 39 for forming a sample image used for determining the light intensity of the correction light CL.

The selection device 34 is used for inputting the light intensity of the outside light OL determined by the observer into the correction light intensity determination section 16. As the selection section 34, there can be used an input section such as a keyboard, an input button, or a touch screen.

The sample image forming section 39 generates the image data of a plurality of types of sample images having the RGB ratio of the correction light CL determined by the correction light type determination section 14 fixed and the respective light intensities different from each other. The information of the plurality of light intensities corresponding to the plurality of types of sample images is supplied to the correction light intensity determination section 16. The projector PJ drives the drive section 4 based on the image data of the sample images to be generated to thereby display the images on the screen 1 by projection.

For example, as shown in FIG. 9, the image data for displaying the plurality of types of sample images SP different in light intensity from each other within the same screen is generated. In the drawing, there is shown an example of displaying the plurality of types of sample images SP having the light intensities corresponding respectively to first through sixth conditions made gradually different from each other on the screen 1. Alternatively, it is also possible to generate a plurality of image data each for displaying one sample image SP in one whole screen and display them in a time-series manner.

FIG. 10 is a flowchart showing the process in the image processing device 30 and the projector PJ according to the present embodiment, and corresponds to FIG. 5 in the first embodiment and FIG. 7 in the second embodiment.

Firstly, the observer X inputs the information of the type of the outside light OL using the input device 21 to thereby designate the type (step S301) similarly to the step S203 in the second embodiment.

Subsequently, the correction light type determination section 14 determines (step S302) the RGB ratio of the correction light CL based on the spectral reflectivity of the screen 1 stored in the storage section 12 and the type of the outside light OL input to the outside light type estimation section 13 similarly to the step S204 in the second embodiment.

Subsequently, the sample image forming section 39 generates the image data of the plurality of types of sample images SP different from each other in the light intensity of the correction light CL having the RGB ratio determined, and then the sample images SP are displayed by projection (step S303) by the projector PJ. The sample images SP are displayed on the screen 1 where the coloration is caused, and as a result, a plurality of correction conditions (the first through sixth conditions in FIG. 9) different from each other in light intensity while fixing the RGB ratio of the correction light CL is presented.

Subsequently, the observer X selects the sample image SP appearing the achromatic color out of the plurality of types of sample images SP thus displayed, and then inputs it (step 304) into the correction light intensity determination section 16 using the selection section 34.

The correction light intensity determination section 16 adopts and then determines (step S305) the light intensity of the sample image SP thus selected as the light intensity of the correction light.

In the image processing device 30 and the projector PJ having such a configuration as described above, it also becomes possible to correct the coloration, which might be caused by the difference in the use environment of the wavelength-selective screen, with low cost and high accuracy.

It should be noted that although in the present embodiment the example is described assuming that the appropriate light intensity of the correction light can be obtained by displaying the sample images SP once, the sample image SP achieving the achromatic color is not necessarily be displayed shortly. Therefore, the following control can also be performed instead of immediately adopting the light intensity of the sample image SP thus selected as the light intensity of the correction light.

For example, as a first step of the light intensity selection, two types of sample images SP, namely the sample image SP having the light intensity higher than the desired light intensity (the light intensity achieving the achromatic color) and the sample image SP having the light intensity lower than the desired light intensity, are selected from the plurality of sample images SP made gradually different in light intensity as shown in FIG. 9. Subsequently, as a second step of the light intensity selection, based on the information of the light intensities of the two sample images SP thus selected, a plurality of sample images SP made gradually different in correction light intensity between the correction light intensities of the two sample images SP is reconfigured and then displayed, and then the observer makes the selection again. It is also possible to set the light intensity of the correction light by subsequently repeating the display and the selection of the sample images SP until the sample image SP achieving the achromatic color on the screen 1 is selected.

Although the explanation is hereinabove presented regarding the preferable embodiments of the invention with reference to the accompanying drawings, it is obvious that the invention is not limited to the embodiments described above. The various shapes and combinations of the constituents presented in the embodiments described above are provided for exemplification only, and can be modified in various ways within the spirit or scope of the invention in accordance with design needs and so on.

The entire disclosure of Japanese Patent Application No. 2010-146292, filed Jun. 28, 2010 is expressly incorporated by reference herein.

What is claimed is:

1. An image processing device adapted to generate image data of a projection image, which is displayed on a projection target surface using a projection display device, having a color obtained by correcting a color of original data representing an image to be displayed so that the projection image has a desired color, the image processing device comprising:
   a storage section adapted to store a spectral reflectivity of the projection target surface;
   a designation section adapted to designate a type of an outside light in an installation environment of the projection target surface;
   a correction light determination section adapted to determine a correction light, a reflected light of which on the projection target surface corresponds to a light having a spectral distribution presenting an achromatic color by overlapping a reflected light of the outside light on the projection target surface, using a spectral distribution of the reflected light of the outside light obtained based on the spectral reflectivity and an exclusive measurement of a spectral distribution of the outside light; and
   a correction section adapted to generate the image data using the original data and data of a spectral distribution of the correction light,
   wherein
   the correction light determination section includes a light intensity measuring section provided in the projection display device, and adapted to measure a light intensity of the reflected light of the outside light entering the projection target surface, and a light intensity of the reflected light of the correction light entering the projection target surface, and a light intensity determination section adapted to determine a light intensity of the correction light so that the achromatic color is presented by overlapping the reflected light of the outside light and the reflected light of the correction light each other based on the light intensity of the reflected light of the outside light, and the light intensity of the reflected light of the correction light.

2. The image processing device according to claim 1, wherein the correction light determination section includes a light intensity measuring section disposed on the projection target surface, and adapted to measure a light intensity of the outside light entering the projection target surface, and a light intensity of the correction light entering the projection target surface, and a light intensity determination section adapted to determine a light intensity of the correction light so that the achromatic color is presented by overlapping the reflected light of the outside light and the reflected light of the correction light each other based on a light intensity of the reflected light of the outside light obtained based on the light intensity of the outside light, the spectral reflectivity, and the spectral distribution of the outside light, and a light intensity of the reflected light of the correction light obtained based on the light intensity of the correction light, the spectral reflectivity, and the spectral distribution of the correction light.

3. The image processing device according to claim 1, wherein the correction light determination section includes a sample image forming section adapted to generate sample image data of a plurality of sample images formed using respective candidate correction lights made different from each other in light intensity, a selection section adapted to allow a user to select a specific sample image out of the plurality of sample images, and a light intensity determination section adapted to determine the light intensity of the candidate correction light forming the specific sample image as a light intensity of the correction light.

4. The image processing device according to claim 1, wherein the storage section stores a characteristic value inherent in the outside light for identifying the outside light with respect to a plurality of types of light assumed as the outside light, and the designation section includes a characteristic value measuring section adapted to measure the characteristic value, and an estimation section adapted to estimate the type of the outside light using a measurement result of the characteristic value measuring section and with reference to the characteristic value stored in the storage section.

5. The image processing device according to claim 1, wherein the storage section stores spectral distributions of a plurality of types of light assumed as the outside light, and the designation section includes an input section adapted to allow a user to select and input the type of the outside light in the installation environment of the projection target surface out of the plurality of types of light.

6. A projection display device comprising:

the image processing device according to claim 1;

an image forming section to which the image data generated by the image processing device is input, and adapted to form the projection image based on the image data; and a projection optical system adapted to display the projection image formed by the image forming section by projection.

7. A projection display device comprising:

the image processing device according to claim 2;

an image forming section to which the image data generated by the image processing device is input, and adapted to form the projection image based on the image data; and a projection optical system adapted to display the projection image formed by the image forming section by projection.

8. A projection display device comprising:

the image processing device according to claim 3;

an image forming section to which the image data generated by the image processing device is input, and adapted to form the projection image based on the image data; and a projection optical system adapted to display the projection image formed by the image forming section by projection.

9. A projection display device comprising:

the image processing device according to claim 4;

an image forming section to which the image data generated by the image processing device is input, and adapted to form the projection image based on the image data; and a projection optical system adapted to display the projection image formed by the image forming section by projection.

10. A projection display device comprising:

the image processing device according to claim 5;

an image forming section to which the image data generated by the image processing device is input, and adapted to form the projection image based on the image data; and a projection optical system adapted to display the projection image formed by the image forming section by projection.

11. An image processing method adapted to generate image data of a projection image, which is displayed on a projection target surface using a projection display device, having a color obtained by correcting a color of original data representing an image to be displayed so that the projection image has a desired color, the image processing method comprising:

obtaining a spectral distribution of a reflected light of an outside light in an installation environment of the projection target surface on the projection target surface based on a spectral reflectivity of the projection target surface and an exclusive measurement of a spectral distribution of the outside light;

calculating a correction light, a reflected light of which on the projection target surface corresponds to a light having a spectral distribution presenting an achromatic color by overlapping a reflected light of the outside light on the projection target surface; and generating the image data obtained by adding data of the correction light to the original data, wherein calculating the correction light includes measuring a light intensity provided in the projection display device, measuring a light intensity of the reflected light of the outside light entering the projection target surface, and measuring a light intensity of the reflected light of the correction light entering the projection target surface, and determining a light intensity of the correction light so that the achromatic color is presented by overlapping the reflected light of the outside light and the reflected light of the correction light based on the light intensity of the reflected light of the outside light, and the light intensity of the reflected light of the correction light.

12. An image processing device adapted to generate image data of a projection image, which is displayed on a projection target surface using a projection display device, having a color obtained by correcting a color of original data representing an image to be displayed so that the projection image has a desired color, the image processing device comprising:

a storage section adapted to store a spectral reflectivity of the projection target surface;

a designation section adapted to designate a type of an outside light in an installation environment of the projection target surface;

a correction light determination section adapted to determine a correction light, a reflected light of which on the projection target surface corresponds to a light having a spectral distribution presenting an achromatic color by overlapping a reflected light of the outside light on the projection target surface, using a spectral distribution of the reflected light of the outside light obtained based on the spectral reflectivity and an exclusive measurement of a spectral distribution of the outside light; and a correction section adapted to generate the image data using the original data and data of a spectral distribution of the correction light, wherein the storage section stores a characteristic value inherent in the outside light for identifying the outside light with respect to a plurality of types of light assumed as the outside light, and the designation section includes a characteristic value measuring section adapted to measure the characteristic value, and an estimation section adapted to estimate the type of the outside light using a measurement result of the characteristic value measuring section and with reference to the characteristic value stored in the storage section.

13. The image processing device according to claim 12, wherein the correction light determination section includes a light intensity measuring section disposed on the projection target surface, and adapted to measure a light intensity of the outside light entering the projection target surface, and a light intensity of the correction light entering the projection target surface, and a light intensity determination section adapted to determine a light intensity of the correction light so that the achromatic color is presented by overlapping the reflected light of the outside light and the reflected light of the correction light each other based on a light intensity of the reflected light of the outside light obtained based on the light intensity of the outside light, the spectral reflectivity, and the spectral distribution of the outside light, and a light intensity of the reflected light of the correction light obtained based on the light intensity of the correction light, the spectral reflectivity, and the spectral distribution of the correction light.

14. The image processing device according to claim 12, wherein the correction light determination section includes a sample image forming section adapted to generate sample image data of a plurality of sample images formed using respective candidate correction lights made different from each other in light intensity, a selection section adapted to allow a user to select a specific sample image out of the plurality of sample images, and a light intensity determination section adapted to determine the light intensity of the candidate correction light forming the specific sample image as a light intensity of the correction light.

15. The image processing device according to claim 12, wherein the storage section stores spectral distributions of a plurality of types of light assumed as the outside light, and the designation section includes an input section adapted to allow a user to select and input the type of the outside light in the installation environment of the projection target surface out of the plurality of types of light.

16. A projection display device comprising:

the image processing device according to claim 12;

an image forming section to which the image data generated by the image processing device is input, and adapted to form the projection image based on the image data; and a projection optical system adapted to display the projection image formed by the image forming section by projection.

\* \* \* \* \*